United States Patent [19]

Bishop

[11] 4,215,591
[45] Aug. 5, 1980

[54] LOW FRICTION RACK AND PINION STEERING GEAR

[76] Inventor: Arthur E. Bishop, 17 Burton St., Mosman, N.S.W. 2088, Australia

[21] Appl. No.: 876,166

[22] Filed: Feb. 8, 1978

[30] Foreign Application Priority Data

Feb. 9, 1977 [AU] Australia ............................ PC9004

[51] Int. Cl.² ............................................ F16H 1/18
[52] U.S. Cl. ............................ 74/422; 74/424.6; 74/498
[58] Field of Search ............... 74/424.6, 422, 498, 74/500, 388 PS; 180/147, 148

[56] References Cited

U.S. PATENT DOCUMENTS

| 3,433,501 | 3/1969 | Hertel | 74/500 |
|---|---|---|---|
| 3,554,048 | 1/1971 | Adams | 74/498 |
| 3,572,157 | 3/1971 | Adams et al. | 74/498 |
| 3,572,158 | 3/1971 | Adams | 74/498 |
| 3,908,479 | 9/1975 | MacDuff | 74/498 |
| 4,016,774 | 4/1977 | Baker et al. | 74/424.6 |
| 4,116,085 | 9/1978 | Bishop | 74/498 |

FOREIGN PATENT DOCUMENTS

| 462162 | 1/1973 | Australia . | |
|---|---|---|---|
| 2049386 | 4/1972 | Fed. Rep. of Germany . | |
| 2122892 | 9/1972 | France . | |
| 976661 | 12/1964 | United Kingdom | 74/498 |

Primary Examiner—C. J. Husar
Assistant Examiner—Conrad Berman
Attorney, Agent, or Firm—Hill, Van Santen, Steadman, Chiara & Simpson

[57] ABSTRACT

A rack and pinion steering gear in which the rack is supported under normal or lightly loaded conditions by one or more rolling elements bearing on a face or faces of the rack, the support being spring loaded to urge the rack into slack-free engagement with the pinion. A second support means providing plain bearing faces is arranged so as to be normally out of contact with the face of the rack opposite the teeth by a predetermined and adjustable amount, the structure being such that when higher forces are applied tending to separate the rack and pinion the spring loading of the first support is resiliently deformed to allow the rack to come into contact with the second support.

6 Claims, 6 Drawing Figures

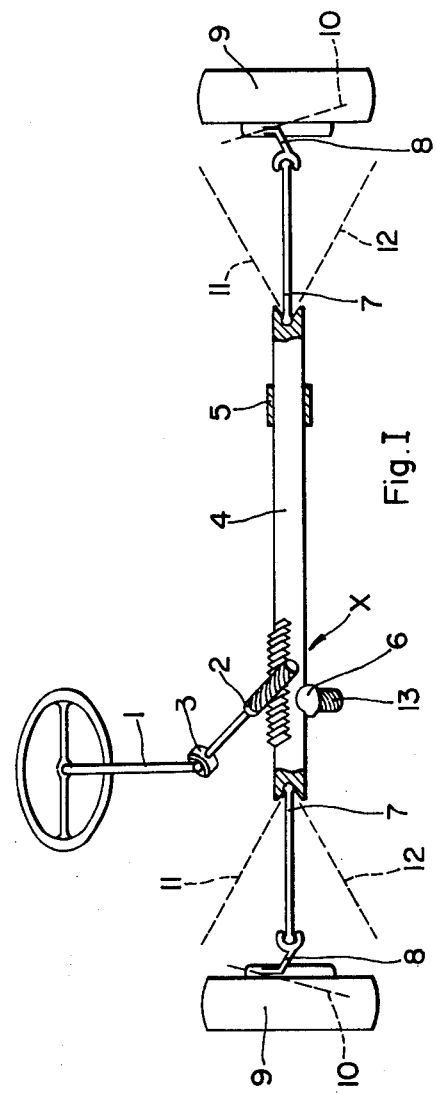

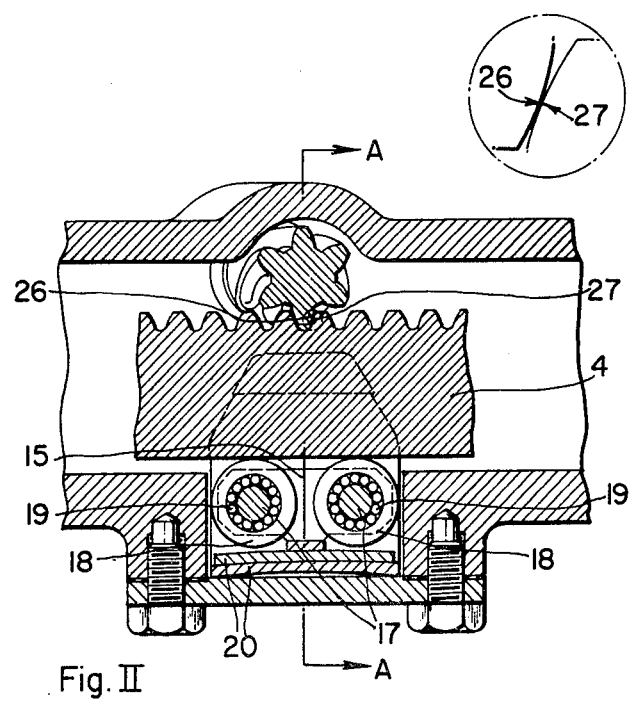
Fig. II
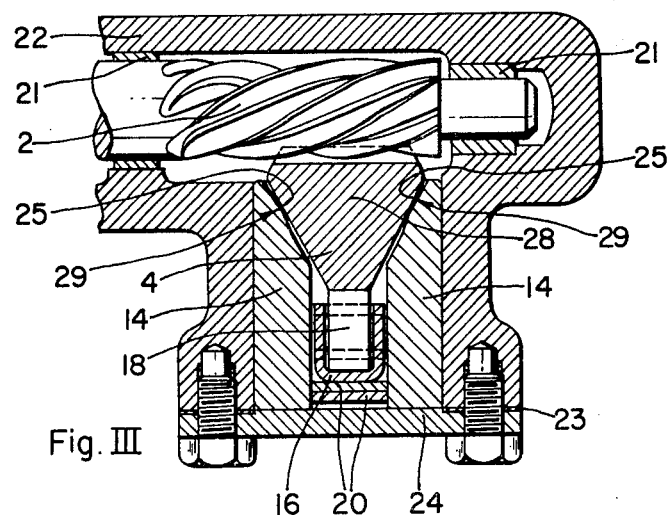
Fig. III

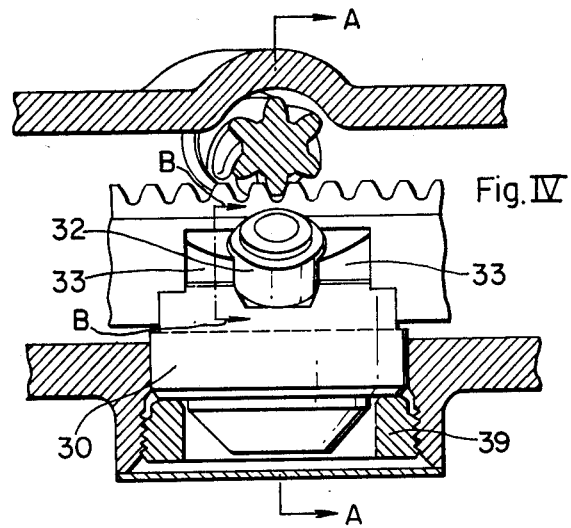
Fig. IV
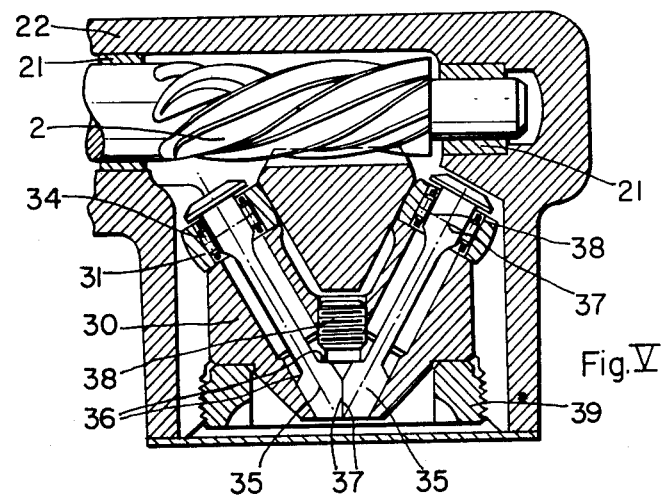
Fig. V
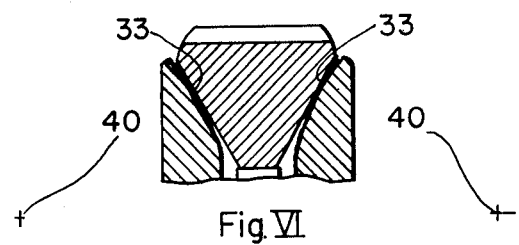
Fig. VI

LOW FRICTION RACK AND PINION STEERING GEAR

Rack and pinion steering is becoming increasingly popular for passenger car steering in both manual and power types because of its simplicity and low cost, and also because it is stiff and precise as compared to the recirculating ball nut integral gear widely used until now. However, it has certain serious shortcomings. For example, in order to keep the mesh between the rack and pinion free of slack, it is usual practice to arrange a springloaded support or guide for the rack opposite the pinion, notwithstanding that an undesirable degree of friction is introduced into the operation of the gear, as will be discussed later.

Slack between the rack and pinion teeth results in lost motion of the steering wheel and leads to the development of a vibration called rack rattle when the car traverses irregular roads. The springload acting on the support must be sufficient to oppose not only the separating forces between rack and pinion due to inclination of the flanks of the teeth, but also those due to forces applied to the ends of the rack through the tie-rods by the wheels. The separating forces from the tie-rods can be very high, particularly when shock loads occur at an instant when the tie-rods are inclined at a large angle to the rack axis during extreme movements of the suspension. To avoid using an excessively high springload, to cater for this occurrence with resulting intolerable high friction, it is usual practice to cater only for average forces, and to arrange that when higher loads occur, the rack support can move away from the pinion only a small distance, say 0.005". Some noise may result from this movement, but by making the movement small, it can be minimized, and will usually only occur infrequently.

Typically, a springload of around 80 lb. is used in manual steering gear and about 40 lb. in power gears. Less separating forces occur in the latter, because the hydraulic system opposes axial forces on the rack and hence reduces tooth separating forces.

The rack support conventionally used is a plain bearing, and under such a spring load, applies a drag such that axial forces acting on the rack ends by the suspension, of less than about 50 lb., produce no rotation of steering wheel. (The drag of the rack support is less in power steering gears due to the lesser spring force, but this is offset by the drag of the seals on the piston rod-rack, so that the figure of about 50 lb. is true for both manual and power types). The reverse efficiency in this regime is therefore zero.

The effect of this drag is that the steering wheel has poor returnability to straight and, in fact, virtually none were it not for vibration caused by road irregularities and road "feel" is inadequate, particularly in wet or icy conditions when tire castoring forces are low. In this regime, forces acting on the ends of the rack as low as 5 or 10 lbs. are significant in indicating to the driver the onset of skidding.

On the other hand, when extreme forces are applied to the rack by the suspension, for example, up to 3000 lb., the drag of the rack support increases only slightly, so that the reverse efficiency of the steering gear in this regime rises to say from 70% to 90%. An undesirable degree of shock is transmitted to the driver under these conditions. Note that these high-order forces are of the order of 500 times greater than the lower order forces.

It will be evident that the effect of the friction of a rack support of conventional design on the operation of the gear in these two differing regimes is the opposite of that required, and that herein lies one of the chief defects in this type of steering gear.

Some designers mount the steering gear on rubber bushes, in order to reduce the transmission to the driver of shock forces. This, however, loses some of the quality of steering precision and stiffness, for which rack and pinion is known, and is therefore an undesirable compromise.

Other designers, in an attempt to improve the "feel" of rack and pinion steering in the low-force regime, substitute rolling bearings for plain bearings in the rack support. The claim is made that the improved efficiency also reduces steering efforts when parking. However, the transmission of shock loads is increased in such designs, which is a serious disadvantage.

A further practical disadvantage of merely substituting rolling bearings for plain bearings is that they must also carry the high loads associated with road shock. In the space available to fit the rack support it is difficult to provide rolling bearings of suitable capacity which will not rapidly deteriorate in service due to the high-order shock loads.

An example of such a design is found in U.S. Pat. No. 3,421,387 of Adams which uses a roller support spring the back of the rack. However, the design fails to suppress shock loads, or provide adequate bearings to carry high loads.

It is an aim of the present invention to provide a design of rack support which overcomes the above mentioned disadvantages of the prior art in an entirely practical manner.

This aim is achieved by providing a two-piece rack support having one or more spring-loaded rolling elements which, in the normal, low-force mode of operation, urge the rack into mesh with the pinion. However, the rack support also incorporates angularly inclined plain guide or gearing faces on opposite sides of the rack having, in the normal mode of operation, a slight clearance therefrom. This pre-determined clearance, which may be of the order of 0.003", is adjusted and set at the assembly of the steering gear.

At some pre-determined load, the spring-loaded rolling element will move away from the pinion allowing the rack to move to take up the slight clearance so that it then bears on the angularly inclined guide faces. Thus, under the shock-load mode of operation the plain bearings carry the separating forces.

The efficiency of a steering gear so arranged is high for light loads as when the rolling elements are supporting the rack, but becomes significantly less when the rack moves away from the pinion and the plain guide faces support the rack as under shock load.

As before, the load at which the rolling element move away from the pinion must be great enough to overcome the separating forces associated with the inclination of the flanks of the teeth (the pressure angle) so that the arrangement is not prone to vibrate as in "rack-rattle". It will generally be shown about 80 lb., as before.

The efficiency in the rolling element mode of operation should be as high as possible, and that of the plain guide mode of operation should be low. However, if this difference were solely due to the magnitude of the loads in the steering gear, the arrangement would still be unsatisfactory. For example, when parking, loads are high, and it is desirable that the efficiency be high to minimize the effort required of the driver.

It is important that the high or low efficiency modes of operation apply depending on whether the loads originate with the driver turning the steering wheel, or whether they originate from road shock and castoring forces. There are several ways to give the steering gear this discriminating quality of operation.

Firstly, the difference of efficiency between the two modes can be increased by making the guide faces more steeply inclined to each other so as to comprise, in effect, a "vee" bearing. Thus, friction is increased for a given magnitude of separating forces of the rack and pinion teeth. Such an arrangement is fortuitously provided if the rack is triangular in section, an arrangement advocated in co-pending Australian Patent Application No. PC4436/75 (20558/76), now known as Australian Pat. No. 498,666 with the object of achieving optimum tooth strength and rack bending strength. As noted in that specification, it is essential to the functioning of the triangular rack bar in order to accomplish these objects that it be free to roll slightly in its guide. It is also desirable for the satisfactory operation of the present invention that the rack is free to roll slightly. Unless this were the case, it would be difficult in practice to achieve the fine clearance between the plain guide faces on the rack when operating in the normal mode, as is so important to the satisfactory operation of the invention.

A triangular form of rack is illustrated in the drawings of the specification, although the present invention would work satisfactorily with other, more conventional shaped sections of rack which also allow rolling, as for example, a round bar.

Secondly, the magnitude of the separating forces can be increased by using an increased tooth pressure angle, particularly in the near-center region where the steering most frequently operates and is most prone to rattle. Conventionally, a 20° pressure angle is used. However, again, fortuitously, such teeth occur in a variable ratio manual rack and pinion system such as described in Australian Pat. No. 462,162, where the on-center teeth may have a pressure angle of 30° to 35°.

Thirdly, the desirable discrimination in efficiency between driver and suspension origin of forces is partly provided by the sliding action between the tooth faces of the pinion and rack. This is particularly the case when the teeth are so designed that the pinion has full addendum and no dedundum action. The sliding or frictional force vectors between the teeth tend to increase the separating force when the rack drives the pinion and to reduce the force when the pinion drives the rack.

Finally, by careful selection of tooth helix angles and the angle at which the pinion axis is inclined to the rack, a further difference of efficiency may be obtained. This phenomenon is already well known in the art of design of rack and pinion steering gear.

The invention thus consists in the provision in a rack and pinion gear of a two-phase rack support system comprising first and second supports, said first support comprising one or more rolling elements bearing on a face or faces of the rack substantially opposite the toothed face of the rack, said first support being spring loaded to urge the rack into slack-free engagement with the pinion in a first or normal mode of operation of the steering gear associated with low-order steering forces, and a second support comprising plain bearing faces arranged to bear on a face or faces of the rack opposite the toothed face of the rack, but normally clear by a small and pre-determined amount, adjustment means whereby said amount may be varied, said first support and the rack being arranged to move away from the pinion under higher steering forces so that the rack then bears on the second support.

It is preferred that the first and second support means are arranged and constructed so that, while carrying the loads associated with either the normal, low-order steering forces or the higher forces, they do not prevent slight rotation of the rack about its axis as result of deflections or slight errors of alignment of the rack teeth in their engagement with those of the pinion.

It is further preferred that the second support has plain bearing faces obliquely set with respect to each other and so arranged that a wedging effect is obtained to increase the drag of the rack when the steering gear is operating under higher loads.

In order that the nature of the invention may be better understood, preferred forms thereof are hereinafter described by way of example, with reference to the accompanying drawings in which:

FIG. I is a schematic drawing showing the general features of the rack and pinion steering gear installed in a car, but with the housing and supporting structures removed, the view being from the front of the car.

FIG. II shows a part-section through the longitudinal axis of the rack where the pinion intersects in the direction generally indicated by the arrow "X" in FIG. I.

FIG. III is a section along the line A—A of FIG. II.

FIG. IV shows an alternative construction in part-section, again in the general direction indicated by X of FIG. I.

FIG. V is a section along line A—A of FIG. IV.

FIG. VI is a part section along the line B—B of FIG. IV.

Returning to FIG. I, steering shaft 1, carrying the steering wheel drives pinion 2 through universal joint 3. Rotation of pinion 2 causes lateral movement of rack 4, tie-rods 7 and steering arms 8, producing steered motion of the left and right wheels 9, about their respective steering axes 10. Rack 4 slides in journal 5 and rack support 6, both of which are carried by a housing mounted to the frame of the car. The housing, which is omitted in this view for clarity, also carries journals for pinion 2.

FIG. I is a view looking towards the front of the car, so that the up and down suspension travels of the wheels 9 cause articulation of tie-rods 7 to extreme positions, up as at 11 and down as at 12. Rack support 6, conventionally of one piece, is pushed upwardly by spring 13 so to keep the rack in slack-free engagement with pinion 2 in normal operation.

It will be evident that if the tie-rod in the left side of the drawing were in position II, and were at the same instant, subject to compressive forces, or in a position 12 and subject to tension forces, there would be a tendency for rack support 6 to overcome spring 13 and move down, causing rack 4 and pinion 2 to separate.

It is generally arranged that tie-rods 7 lie substantially horizontal and hence coaxial with rack 4 at the normal riding height of the vehicle, so there is little tendency for tie-rod forces to cause such separation.

Referring now to FIG. II and III which show the preferred construction of a two-phase rack support, it will be seen that the rack support is arranged to comprise two bearing supports 14, on each side of rack 4, and a roller support structure 15 lying between supports 14.

Roller structure support 15 comprise a folded sheet metal carriage 16 carrying two pins 17 which mount, two rollers 18 on needle bearings 19.

Carriage 16 is forced upwardly by one or more leaf springs 20, and so urges rack 4 into tight mesh with pinion 2.

Pinion 2 is carried on journals 21 in housing 22 and by an additional thrust bearing (not shown) which resist the axial force produced by the spiral pinion.

Rack supports 14 fit closely in housing 22 and are adjusted for their position vertically at assembly of the steering gear by selecting shim 23 so that the clearance between the rack and the supports as at 25 is about 0.003".

The leaf springs 20 are designed to apply a force of about 80 lb. between the rollers 18 and rack 4. The engagement between the flank of a pinion tooth as at 26 and the inclined flank of a tooth as at 27 will have a vector tending to cause the rack to move away from the pinion. As mentioned earlier, this will generally be insufficient to the deflect springs 20, so that the rack will move freely on rollers 19. If contact occurs between the rack and bearing faces of plain bearing supports 14 due to slight side forces, it will only be with one of them and not with both at the same instant. However, when the tie-rods are inclined as at 11 or 12, and at the same instant, carry large compression or tension loads, springs 20 will be overcome and the rack will be driven downwards, compressing springs 20 so it becomes carried on plain bearing supports 14.

Rack 4, in the design illustrated, has a section in the form of an equilateral triangle having truncated vertices. These truncated faces are curved, having a center of curvature about the center of the triangle as at 28. Note that the faces of rack supports 14 in section are slightly convex, having typically centers of radius as at 28. By so forming these journal faces, slight rolling of the rack about its axis 27 as may occur due to variations of the conditions of mesh with pinion 4 will not upset the fine clearance established at 25, or interfere with the free reciprocation of the rack on its roller support.

Under high-load conditions when the rack rides on the faces of supports 14, a wedging effect is obtained because of their inclination to each other, with consequent increase in drag or friction. This will tend to suppress the feedback of high forces to the driver more than if the angle between the adjacent bearing faces of rack supports 14 were large, as in current practice.

FIGS. IV and V, shown an alternative construction of the two-phase rack support in which the rollers bear on opposing faces of the rack, one on each side. The plain rack support 30, in this construction, preferably of one piece and bears on each side of the rack as did previously described rack supports 14. However, roller supports 31 are now arranged one each side of the rack center-line, and the rack supports are recessed to accomodate them with working clearance as at 32. The bearing faces of rack support 30 therefore now comprises four separate lands as at 33.

Rollers 31 are journalled on needle bearings 34 as before, but are now carried by cantilever beams or axles 35 each side, rigidly secured in plain support 30 at their lower ends. These axles 35 are reduced to a rectangular shape over part of their length as at 36 in order to increase their flexibility. In the arrangement shown, rigid fixing of axles 35 is achieved by providing accurate holes in support 30 in which they fit, bevelling their faces to abut each other as at 37, and securing them by a set screw 38 which bears on shoulders where they are reduced in section. Other means of fixing may be used.

Axles 35, as installed in the normal operation position as shown, are deflected from their free state so that the center of the roller journal shown as pint 37, occupies a position 38 in the free condition. As installed, they are proportioned so that each roller exerts some pre-determined force on the side of the rack, for example, 80 lb. The upward resultant of this normal force, for a triangular rack having sides inclined at 60° to each other, is 40 lb., so that the net upwards force of two rollers is 80 lb. as before.

It is again desired that, in the normal operating position, a fine clearance exists between the plain support faces 33 and the rack of about 0.003" as illustrated in FIG. VI. This fine clearance is set at assembly of the steering gear by adjusting nut 39, so carrying the plain rack support together with the roller supports up and down as required. Suitable means are provided to lock the position of nut 39.

Again, it is desired that rack 4 be able to roll slightly about its axis, and to this end, the faces of rack supports 30 are made arcuate about some center as 40. Rollers 31 are slightly crowned, as shown, for the same reason.

To this point the operation of the alternative rack support is substantially the same as the earlier described design. However, it will be evident that, whereas rollers 15 provided no centrallizing effect, the rollers 31 will tend to keep the rack central in its clearance in support 30. This arrangement will be advantageous where, for example, pinion 2 employs a steep helix, resulting in high side forces on the rack.

I claim:

1. In a rack and opinion gear comprising a rack having teeth on one face thereof for cooperation with a pinion, a two-phase rack support system including first and second supports, said first support comprising at least one rolling element bearing on at least one face of the rack substantially opposite the toothed face of the rack, said first support being spring loaded to urge the rack into slack-free engagement with the pinion in a first or normal mode of operation of the steering gear associated with low-order steering forces, and a second support comprising a plain bearing face arranged to bear on at least one face of the rack opposite the toothed face of the rack, but normally out of contact with the rack by a small and predetermined clearance, whereby the rack moves away from the pinion under higher steering forces so that the rack then bears on the second support.

2. The structure of claim 1 wherein the plain bearing comprises a pair of faces oblique to each other and on either side of said rack for contact with two faces thereof and which would intersect, if extended, on the side of the rack remote from the pinion.

3. The structure of claim 2 wherein the rolling element is positioned between said plain bearing faces.

4. The structure set forth in claim 1 including adjustment means for varying said clearance.

5. The structure of claim 2 wherein the plain bearing comprises a pair of faces oblique to each other and on either side of said rack for contact with two faces thereof and which would intersect, if extended, on the side of the rack remote from the pinion.

6. The structure of claim 5 wherein the rolling element is positioned between said plain bearing faces.

* * * * *